(12) United States Patent
Hasegawa et al.

(10) Patent No.: US 7,052,626 B1
(45) Date of Patent: May 30, 2006

(54) FLUID COMPOSITIONS CONTAINING REFRIGERATION OILS AND CHLORINE-FREE FLUOROCARBON REFRIGERANTS

(75) Inventors: Hiroshi Hasegawa, Yokohama (JP); Noboru Ishida, Yokohama (JP); Umekichi Sasaki, Yokohama (JP); Tatsuyuki Ishikawa, Yokohama (JP)

(73) Assignee: Nippon Mitsubishi Oil Corporation, Tokyo (JP)

( * ) Notice: Subject to any disclaimer, the term of this patent is extended or adjusted under 35 U.S.C. 154(b) by 0 days.

(21) Appl. No.: 09/057,684

(22) Filed: Apr. 9, 1998

Related U.S. Application Data

(63) Continuation-in-part of application No. 08/539,001, filed on Oct. 4, 1995, now Pat. No. 6,582,621, which is a continuation of application No. 08/193,281, filed on Feb. 8, 1994, now abandoned, which is a continuation-in-part of application No. 08/019,177, filed on Jan. 28, 1993, now abandoned, which is a continuation of application No. 07/634,054, filed on Dec. 26, 1990, now abandoned.

(30) Foreign Application Priority Data

| Dec. 28, 1989 | (JP) | ................................... 1-341244 |
| Dec. 28, 1989 | (JP) | ................................... 1-341245 |
| Apr. 20, 1990 | (JP) | ................................... 2-105772 |
| May 14, 1990 | (JP) | ................................... 2-121133 |

(51) Int. Cl.
C10M 105/34 (2006.01)
C10M 105/38 (2006.01)
C10M 111/04 (2006.01)
C09K 5/00 (2006.01)

(52) U.S. Cl. ............................ 252/68; 252/67; 508/485; 508/495

(58) Field of Classification Search ................ 252/68, 252/67; 508/485, 495
See application file for complete search history.

(56) References Cited

U.S. PATENT DOCUMENTS

| RE19,265 | E | * | 8/1934 | Midgley, Jr. et al. .......... 62/114 |
| 2,807,155 | A | * | 9/1957 | Williamitis ................... 62/502 |
| 4,178,765 | A | * | 12/1979 | Slayton .......................... 62/83 |
| 4,851,144 | A | * | 7/1989 | McGraw et al ................ 252/68 |
| 5,021,179 | A | * | 6/1991 | Zehler et al. .................. 252/68 |
| 5,096,606 | A | | 3/1992 | Hagihara et al. ............. 252/68 |
| 5,185,092 | A | | 2/1993 | Fukuda et al. ................ 252/56 |
| 5,202,044 | A | * | 4/1993 | Hagihara et al ............. 252/68 |
| 5,211,884 | A | | 5/1993 | Bunemann et al. ........... 252/56 |
| 5,279,752 | A | * | 1/1994 | Hasegawa et al. ............ 252/68 |
| 5,391,311 | A | * | 2/1995 | Ishida et al. ................ 508/304 |
| 5,447,647 | A | * | 9/1995 | Ishida et al ................... 252/68 |
| 5,464,550 | A | * | 11/1995 | Sasaki et al. .................. 252/68 |
| 5,494,597 | A | * | 2/1996 | Krevalis, Jr et al ........... 252/68 |
| 5,512,198 | A | * | 4/1996 | Sasaki et al. .................. 252/68 |
| 5,620,950 | A | * | 4/1997 | Kamakura et al ........... 508/485 |
| 5,653,909 | A | * | 8/1997 | Muraki et al .................. 252/68 |
| 5,728,655 | A | * | 3/1998 | Muraki et al ................ 508/304 |
| 5,744,053 | A | * | 4/1998 | Kaimai ........................ 252/68 |
| 5,746,933 | A | * | 5/1998 | Ishida et al. .................. 252/68 |
| 5,804,096 | A | * | 9/1998 | Sato et al ...................... 252/68 |
| 6,153,118 | A | * | 11/2000 | Hasegawa et al. ............. 252/68 |
| 6,207,071 | B1 | * | 3/2001 | Takigawa et al. ............. 252/68 |
| 6,228,282 | B1 | * | 5/2001 | Shimomura et al. .......... 252/68 |
| 6,251,300 | B1 | * | 6/2001 | Takigawa et al. ............. 252/67 |
| 6,263,683 | B1 | * | 7/2001 | Tazaki .......................... 62/114 |
| 6,410,492 | B1 | * | 6/2002 | Shimomura et al. ........ 508/485 |
| 6,582,621 | B1 | * | 6/2003 | Sasaki et al. .................. 252/68 |
| 6,666,985 | B1 | * | 12/2003 | Schnur et al. ................. 252/68 |
| 6,667,285 | B1 | * | 12/2003 | Kawahara et al. .......... 508/485 |
| 6,759,373 | B1 | * | 7/2004 | Tazaki ........................ 508/462 |
| 6,774,093 | B1 | * | 8/2004 | Carr et al. ................... 508/485 |
| 6,828,286 | B1 | * | 12/2004 | Komiya et al. ............. 508/192 |
| 2002/0193232 | A1 | * | 12/2002 | Kaimai et al. .............. 508/485 |
| 2003/0166478 | A1 | * | 9/2003 | Shimomura et al. ........ 508/304 |
| 2004/0167042 | A1 | * | 8/2004 | Yamazaki et al. .......... 508/462 |

FOREIGN PATENT DOCUMENTS

| DE | 133966 | * | 1/1979 |
| EP | 406479 A1 | * | 1/1991 |
| EP | 430657 A1 | * | 6/1991 |
| EP | 435253 A1 | | 7/1991 |

(Continued)

OTHER PUBLICATIONS

K.S. Sanvordenker, Materials Compatability of R-134a in Refrigerant Systems, CFCs: Time of Transition, 1989, pp. 211-216.

K.S. Sanvordenker, et al., A Review of Synthetic Oils for Refrigeration Use, ASHRAE Symposium Bulletin NA-72-5, 19, pp. 14-19, date unknown.

*Primary Examiner*—Alan Diamond
(74) *Attorney, Agent, or Firm*—Bucknam and Archer

(57) ABSTRACT

A fluid composition for a refrigerator, which comprises a chlorine-free fluorocarbon refrigerant and a refrigerator oil, said refrigerator oil consisting essentially of a tetraester of pentaerythritol of formula (1)

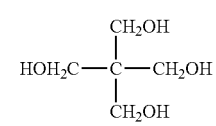

(1)

with both 2-ethylhexanoic acid and 3,5,5-trimethylhexanoic acid, said refrigerator oil exhibiting a pour point not higher than −10° C.

22 Claims, No Drawings

FOREIGN PATENT DOCUMENTS

| | | | |
|---|---|---|---|
| EP | 445610 A1 | | 9/1991 |
| EP | 448402 A2 | * | 9/1991 |
| EP | 479338 A2 | * | 4/1992 |
| EP | 480479 A2 | * | 4/1992 |
| EP | 514988 A2 | * | 11/1992 |
| EP | 536814 A1 | | 4/1993 |
| JP | 55-155093 | * | 12/1980 |
| JP | 62-292895 | * | 12/1987 |
| RU | 208868 | | 9/1965 |
| WO | 90/12849 | * | 11/1990 |

* cited by examiner

FLUID COMPOSITIONS CONTAINING REFRIGERATION OILS AND CHLORINE-FREE FLUOROCARBON REFRIGERANTS

This application is a continuation-in-part of U.S. Ser. No. 08/539,001 filed Oct. 4, 1995 now U.S. Pat. No. 6,582,621, which is a continuation of U.S. Ser. No. 08/193,281 filed Feb. 8, 1994, now abandoned, which is a continuation-in-part of U.S. Ser. No. 08/019,177 filed Jan. 28, 1993, now abandoned, which is a continuation of U.S. Ser. No. 07/634,054 filed Dec. 26, 1990, now abandoned.

BACKGROUND OF THE INVENTION

1. Field of the Invention

This invention relates to a fluid composition for compressors of refrigerators comprising a chlorine-free fluorocarbon as a refrigerant and a lubricating oil (the oil being hereinafter referred to as "a refrigerator oil for use with a chlorine-free fluorocarbon refrigerant") and, more specifically, it relates to such a fluid composition which comprises a specific ester as a base oil and is superior in various properties.

2. Prior Art

Generally, naphthenic mineral oils, paraffinic mineral oils, alkylbenzenes, polyglycolic oils, ester oils and mixtures thereof, which have each a kinematic viscosity of 10–200 cSt at 40° C., as well as these oils incorporated with suitable additives have been used as refrigerator oils.

On the other hand, chlorofluorocarbons (CFCS) type refrigerants, such as CFC-11, CFC-12, CFC-113 and HCFC-22, have been used for refrigerators.

Of these CFCS, CFCS such as CFC-11, CFC-12 and CFC-113, which are obtained by substituting all the hydrogen atoms of hydrocarbons thereof by halogen atoms including chlorine atoms, may lead to the destruction of the ozone layer, and therefore, the use of the CFCS has been controlled. Accordingly, chlorine-free fluorocarbons, such as HFC-134a and HFC-152a, have been being used as substitutes for CFCS. HFC-134a is especially promising as a substitute refrigerant since it is similar in thermodynamic properties to CFC-12 which has heretofore been used in many kinds of refrigerators of home cold-storage chests, air-conditioners and the like.

Refrigerator oils require various properties, among which their compatibility with refrigerants is extremely important in regard to lubricity and system efficiency in refrigerators. However, conventional refrigerator oils comprising, as the base oils, naphthenic oils, paraffinic oils, alkylbenzenes, heretofore known ester oils and the like, are hardly compatible with chlorine-free fluorocarbons such as HFC-134a. Therefore, if these conventional refrigerator oils are used in combination with HFC-134a, the resulting mixture will separate into two layers at normal temperature so as to degrade the oil-returnability which is the most important within the refrigeration system and cause various troubles such as a decrease in refrigeration efficiency, the deterioration of lubricity and the consequent seizure of the compressor within the system whereby the refrigerator oils are made unsuitable for use as such. In addition, polyglycolic oils are also known as refrigerator oils for their high viscosity index and are disclosed in, for example, JP-A-57-42119 and JP-A-61-52880 and JP-A-57-51795. However, the polyglycolic oils disclosed in these prior art publications are not fully compatible with HFC-134a thereby raising the same problems as above and rendering them unusable.

Further, U.S. Pat. No. 4,755,316 discloses polyglycolic refrigerator oils which are compatible with HFC-134a and U.S. Pat. No. 4,851,144 discloses refrigerator oils comprising a mixture of an ester and a polyglycol which are compatible with HFC-134a. In addition, the present inventors developed polyglycolic refrigerator oils which have excellent compatibility with HFC-134a as compared with conventional known refrigerator oils, filed an application for a patent for the thus developed polyglycolic refrigerator oils and have already obtained a patent (U.S. Pat. No. 4,948,525) therefor. It has been found, however, that the polyglycolic oils raise problems as to their high compatibility with water and inferior electrical insulating property.

On the other hand, refrigerator oils used in compressors of home refrigerators and the like are required to have a high electrical insulating property. Among the known refrigerator oils, alkylbenzenes and the mineral oils have the highest insulating property, but they are hardly compatible with chlorine-free fluorocarbons such as HFC-134a as mentioned above. WO 90/12849 describes a composition comprising a hydrogen-containing halogenocarbon and a specific ester lubricant. No refrigerator oil having both high compatibility with chlorine-free fluorocarbons such as HFC-134a and a high insulating property has been developed prior to the present invention.

SUMMARY OF THE INVENTION

The present inventors made various intensive studies in attempts to develop refrigerator oils which can meet the aforesaid requirements and, as the result of their studies, they found that esters having specific structures have excellent compatibility with chlorine-free fluorocarbons such as HFC-134a, a high electrical insulating property, and a low pour point as well as excellent lubricity. The present invention is based on this finding.

The object of the present invention is to provide fluid compositions comprising a refrigerator oil and a chlorine-free fluorocarbon refrigerant, the oil comprising as a major component (or a base oil) an tetraester having a specific structure and having excellent compatibility with chlorine-free fluorocarbons such as HFC-134a, high electrical insulating property, high wear resistance, low hygroscopicity, and high thermal and chemical stability.

The present invention provides a fluid composition for a refrigerator, which comprises a chlorine-free fluorocarbon refrigerant and a refrigerator oil, said refrigerator oil consisting essentially of a tetraester of pentaerythritol of formula (1)

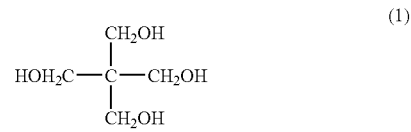

with both 2-ethylhexanoic acid and 3,5,5-trimethylhexanoic acid.

The tetraester products obtained by any conventional methods may be refined to remove the by-products and/or unreacted reactants, but the by-products and/or unreacted reactants may be present in small amounts in the refrigerator oils according to the present invention as far as they do not impair the excellent performances thereof.

In the preparation of the refrigerator oil according to the present invention, the ester mentioned above may be used singly, or jointly as a mixture of at least one kind of other esters for adding to the base oil.

The kinematic viscosities of the base oil according to the present invention are in the range of preferably 2–150 cSt, more preferably 5–100 cSt at 100° C.

The refrigerator oil according to the present invention may contain as the only base oil the tetraester of pentaerithritol with both 2-ethylhexanoic acid and 3,5,5-trimethylhexanoic acid and, as required, it may be incorporated with paraffinic mineral oils, naphthenic mineral oils, polyα-olefins, alkylbenzenes and the like, but, in this case, the resulting mixed oil will have less compatibility with hydrogen-containing halogenocarbons.

The amount of these conventional oils so incorporated is not particularly limited as far as the excellent performances of the refrigerator oil according to the present invention are not impaired, but the tetraester of pentaerythritol with both 2-ethylhexanoic acid and 3,5,5-trimethylhexanoic acid should be present in the resulting mixed oil in a ratio of usually more than 50% by weight, preferably not less than 70% by weight of the total amount of the mixed oil.

To further improve the refrigerator oil according to the present invention in thermal stability and chemical stability, it is incorporated with at least one kind of an epoxy compound. The epoxy compound used herein is preferably selected from the group consisting of phenylglycidyl ether epoxy compounds, alkylglycidyl ether epoxy compounds, glycidyl ester epoxy compounds, aryloxirane compounds, alkyloxirane compounds, alicyclic epoxy compounds, epoxidized fatty acid monoesters and epoxidized vegetable oils.

The phenylglycidyl ether epoxy compounds used herein include phenylglycidyl ether and derivatives thereof such as alkylphenylglycidyl ethers. The alkylphenylglycidyl ethers are those having 1 to 3 alkyl groups having 1 to 13 carbon atoms, among which are preferred those having an alkyl group having 4 to 10 carbon atoms, such as n-butylphenylglycidyl ether, i-butylphenylglycidyl ether, sec-butylphenylglycidyl ether, tert-butylphenylglycidyl ether, pentylphenylglycidyl ether, hexylphenylglycidyl ether, heptylphenylglycidyl ether, octylphenylglycidyl ether, nonylphenylglycidyl ether and decylphenylglycidyl ether.

The alkylglycidyl ether epoxy compounds include decylglycidyl ether, undecylglycidyl ether, dodecylglycidyl ether, tridecylglycidyl ether, tetradecylglycidyl ether, 2-ethylhexylglycidyl ether, neopentyl glycol diglycidyl ether, trimethylolpropane triglycidyl ether, pentaerythritol tetraglycidyl ether, 1,6-hexanediol diglycidyl ether, sorbitol polyglycidyl ether, polyalkylene glycol monoglycidyl ethers and polyalkylene glycol diglycidyl ethers.

The glycidyl ester epoxy compounds include phenylglycidyl esters, alkylglycidyl esters and alkenylglycidyl esters with glycidyl 2,2-dimethyl octanoate, glycidyl benzoate, glycidyl acrylate, glycidyl methacrylate and the like being preferred.

The aryloxirane compounds include 1,2-epoxystyrene and alkyl-1,2-epoxystyrene.

The alkyloxirane compounds include 1,2-epoxybutane, 1,2-epoxypentane, 1,2-epoxyhexane, 1,2-epoxyheptane, 1,2-epoxyoctane, 1,2-epoxynonane, 1,2-epoxydecane, 1,2-epoxyundecane, 1,2-epoxydodecane, 1,2-epoxytridecane, 1,2-epoxytetradecane, 1,2-epoxypentadecane, 1,2-epoxyhexadecane, 1,2-epoxyheptadecane, 1,1,2-epoxyoctadecane, 2-epoxynonadecane and 1,2-epoxyeicosane.

The alicyclic epoxy compounds include 1,2-epoxycyclohexane, 1,2-epoxycyclopentane, 3,4-epoxycyclohexylmethyl-3,4-epoxycyclohexane carboxylate, bis (3,4-epoxycyclohexylmethyl) adipate, exo-2,3-epoxynorbornane, bis(3,4-epoxy-6-methylcyclohexylmethyl) adipate, 2-(7-oxabicyclo [4.1.0]hept-3-yl)-spiro(1,3-dioxane-5,3'-[7]oxabicyclo [4.1.0]heptane, 4-(1'-methylepoxyethyl)-1,2-epoxy-2-methylcyclohexane and 4-epoxyethyl-1,2-epoxycyclohexane.

The epoxidized fatty acid monoesters include esters of an epoxidized fatty acid having 12 to 20 carbon atoms and an alcohol having 1 to 8 carbon atoms, phenol or an alkylphenol. In particular, butyl, hexyl, benzyl, cyclohexyl, methoxyethyl, octyl, phenyl or butylphenyl esters of epoxidized stearic acid may preferably be used.

The epoxidized vegetable oils include epoxidized compounds of vegetable oils such as soybean oil, linseed oil and cottonseed oil.

Among these epoxy compounds, the preferable ones include phenylglycidyl ether epoxy compounds, alkylglycidyl ether epoxy compounds, glycidyl ester epoxy compounds and alicyclic epoxy compounds.

It is desirable that these epoxy compounds be incorporated in the refrigerator oil according to the present invention in a ratio of 0.1–5.0% by weight, preferably 0.2–2.0% by weight, of the total amount of the refrigerator oil.

The refrigerator oil composition according to the present invention may be incorporated further with at least one kind of a phosphorus compound selected from the group consisting of phosphoric esters, acid phosphoric esters, amine salts of acid phosphoric esters, chlorinated phosphoric esters and phosphorous esters, to improve the oil composition in wear resistance and load resistance. These phosphorus compounds are esters of phosphoric acid or phosphorous acid and an alkanol or a polyether type alcohol, or derivatives of the esters. The phosphoric esters are exemplified by tributyl phosphate, triphenyl phosphate and tricresyl phosphate. The acid phosphoric esters are exemplified by ditetradecyl acid phosphate, dipentadecyl acid phosphate, dihexadecyl acid phosphate, diheptadecyl acid phosphate and dioctadecyl acid phosphate. The amine salts of acid phosphoric esters are exemplified by salts of the above acid phosphoric esters and amines such as methylamine, ethylamine, propylamine, butylamine, pentylamine, hexylamine, heptylamine, octylamine, dimethylamine, diethylamine, dipropylamine, dibutylamine, dipentylamine, dihexylamine, diheptylamine, dioctylamine, trimethylamine, triethylamine, tripropylamine, tributylamine, tripentylamine, trihexylamine, triheptylamine and trioctylamine. The chlorinated phosphoric esters are exemplified by tris-dichloropropyl phosphate, tris chloroethyl phosphate, polyoxyalkylene bis[di(chloroalkyl)]phosphate and tris chlorophenyl phosphate. The phosphorous esters are exemplified by dibutyl phosphite, tributyl phosphite, dipentyl phosphite, tripentyl phosphite, dihexyl phosphite, trihexyl phosphite, diheptyl phosphite, triheptyl phosphite, dioctyl phosphite, trioctyl phosphite, dinonyl phosphite, didecyl phosphite, diundecyl phosphite, triundecyl phosphite, didodecyl phosphite, tridodecyl phosphite, diphenyl phosphite, triphenyl phosphite, dicresyl phosphite, tricresyl phosphite and mixtures thereof. These phosphorus compounds may be added to the refrigerator oil in a ratio of 0.1–5.0% by weight, preferably 0.2–2.0% by weight, of the total amount of the refrigerator oil.

Of course, both of the aforementioned phosphorus compounds and epoxy compounds may be used jointly.

To further enhance the refrigerator oil according to the present invention in performances, the refrigerator oil may be incorporated, as required, with heretofore known additives for a refrigerator oil, which include phenol-type antioxidants such as di-tert-butyl-p-cresol and bisphenol A; amine-type antioxidants such as phenyl-α-naphthylamine and N,N-di(2-naphthyl)-p-phenylenediamine; wear resistant additives such as zinc dithiophosphate; extreme pressure agents such as chlorinated paraffin and sulfur compounds; oiliness improvers such as fatty acids; antifoaming agents such as silicone-type ones; and metal inactivators such as benzotriazole. These additives may be used singly or jointly. The total amount of these additives added is ordinarily not more than 10% by weight, preferably not more than 5% by weight, of the total amount of the refrigerator oil.

The refrigerator oils according to the present invention consisting essentially of a tetraester of pentaerythritol with both 2-ethylhexanoic acid and 3,5,5-trimethylhexanoic acid as the base oil should have such viscosity and pour point as those which are normally suitable for an ordinary refrigerator oil, but they should have a pour point not higher than −10° C., preferably −20° C. to −80° C., to prevent them from solidification at a low temperature. Further, they should desirably have a kinematic viscosity of not less than 2cSt, preferably not less than 3cSt at 100° C., to keep the sealability of the compressor when used, while they should desirably have a kinematic viscosity of not more than 150cSt, preferably not more than 100cSt at 100° C., in view of their fluidity at a low temperature and the efficiency of heat exchange in the evaporator when used.

The refrigerants which may be used in refrigerators in which the fluid composition of the present invention are suitably used, include chlorine-free fluorocarbons such as alkane fluorides having 1–3 carbon atoms, preferably 1–2 carbon atoms. The said chlorine-free fluorocarbons are exemplified by HFCs (chlorine-free type halogenocarbons) such as difluoromethane (HFC-32), trifluoromethane (HFC-23), pentafluoroethane (HFC-125), 1,1,2,2-tetrafluoroethane (HFC-134), 1,1,1,2-tetrafluoroethane (HFC-134a), 1,1,1-trifluoroethane (HFC-143a), 1,1-difluoroethane (HFC-152a) and mixtures thereof. Among these chlorine-free fluorocarbons, HFC-32, HFC-23, HFC-125, HFC-134, HFC-134a and HFC-152a, are preferable in view of the environmental problems. The refrigerant used may suitably be selected from these halogenocarbons mentioned above depending on the purpose for which the resulting refrigerant is used as well as the properties which are desirable for the resulting refrigerant. The preferable refrigerants are exemplified by HFC-134a; a mixture of HFC-134a (60–80 wt %) and HFC-32 (40–20 wt %); a mixture of HFC-32 (50–70 wt %) and HFC-125 (50–30 wt %); a mixture of HFC-134a (60 wt %), HFC-32 (30 wt %) and HFC-125 (10wt %); a mixture of HFC-134a (52 wt %), HFC-32 (23 wt %) and HFC-125 (25 wt %); and a mixture of HFC-143a (52 wt %), HFC-125 (44 wt %) and HFC-134a (4 wt %).

The fluid composition of the present invention for use in a refrigerator is a mixture of the refrigerator oil and a chlorine-free halogenocarbon such as an alkane fluoride as mentioned above.

The mixing ratio of the refrigerator oil and the refrigerant in the resulting composition is not particularly limited, but the refrigerator oil is usually comprised in an amount of 1–500 parts by weight, preferably in an amount of 2–400 parts by weight, based on 100 parts by weight of the refrigerant.

The refrigerator oils according to the present invention are excellent in compatibility with the hydrogen-containing halogenocarbons as compared with the heretofore known refrigerator oils. Further, the refrigerator oils according to the present invention are excellent because they have not only high compatibility with the hydrogen-containing halogenocarbons and high electrical insulating property but also high lubricity, low hygroscopicity, low pour point and high thermal and chemical stability.

The fluid compositions of the present invention may particularly preferably be used in refrigerators, air-conditioners, dehumidifiers, cold-storage chests, freezers, freeze and refrigeration warehouses, automatic vending machines, showcases, cooling units in chemical plants, and the like which have a reciprocating or rotary compressor. Further, the above refrigerator oils may also preferably be used in refrigerators having a centrifugal compressor.

The present invention will be better understood by the following Examples and Comparative Examples.

EXAMPLES 1–2 AND COMPARATIVE EXAMPLES 1–14

First, base oils according to the present invention (Base oil 1) and comparative base oils (Base oils 2–13), which are used in the Examples and Comparative Examples, respectively, are illustrated as follows:

[Base oil 1] A tetraester of pentaerythritol (1 mol), 2-ethylhexanoic, acid (2 mol) and 3,5,5-trimethylhexanoic, acid (2 mol)

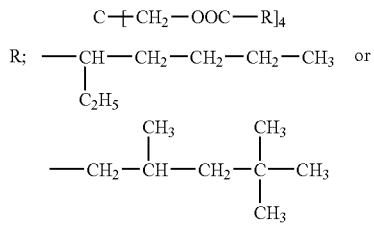

[Base oil 2] A tetraester of pentaerythritol (1 mol) and 2-ethylhexanoic acid (4 mol):

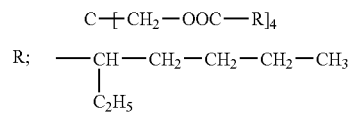

[Base oil 3] A tetraester of pentaerythritol (1 mol) and 3,5,5-trimethylhexanoic acid (4 mol):

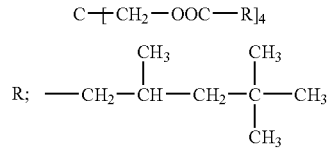

[Base oil 4] A naphthenic, mineral oil.

[Base oil 5] A branched-chain type alkylbenzene (average molecular weight: about 300).

[Base oil 6] Polyoxypropylene glycol monobutyl ether (average molecular weight: about 500)

[Base oil 7] Polyoxypropylene glycol monobutyl ether (average molecular weight: about 1000).

[Base oil 8] Polyoxypropylene glycol (average molecular weight: about 700).

[Base oil 9] Polyoxypropylene glycol (average molecular weight: about 2000).

[Base oil 10] A tetraester of pentaerythritol (1 mol) and n-nonanoic acid (4 mol):

[Base oil 11] A tetraester of pentaerythritol (1 mol) and coconut oil.

[Base oil 12] A triester of trimethylolpropane (1 mol) and n-nonanoic acid (3 mol):

[Base oil 13] A triester of trimethylolpropane (1 mol) and coconut oil.

The refrigerator oils of Examples 1–2 according to the present invention each of which has a composition indicated in the following Table 1 were prepared and then evaluated for their performances that are their miscibility with HFC-134a, insulating property, wear resistance, hygroscopicity and thermal and chemical stability by the following respective test methods. The results thus obtained are indicated in Table 1.

For comparison, the ester of pentaerithritol with 2-ethylhexanoic acid (Comparative Examples 1 and 2), the ester of pentaerythritol with 3,5,5-trimethylhexanoic acid (Comparative Examples 3 and 4), the mineral oil (Comparative Example 5), the alkylbenzene (Comparative Example 6), the polypropylene glycol monoalkyl ethers (Comparative Examples 7 and 8), the polypropylene glycols (Comparative Examples 9 and 10) and the straight-chain fatty acid esters of polyol alcohols (Comparative Examples 11–14) which have heretofore been used as refrigerator oils were evaluated for their performances in the same manner as in Examples 1–2. The results thus obtained are also indicated in Table 1.

(Miscibility with HFC-134a)

0.2 g of the test oil of each of the Examples and the Comparative Examples and 1.8 g of the refrigerant (HFC-134a) were sealed in a glass tube having an inner diameter of 6 mm and a length of 220 mm. This glass tube was then placed in a thermostat maintained at a predetermined low temperature or high temperature to observe whether the refrigerant and the test oil were miscible with each other, separated from each other or made white-turbid.

(Insulating property)

The test oils were each measured for specific volume resistivity at 25° C. in accordance with JIS C 2101.

(FALEX wear test)

The test oils were each applied to a test journal for measuring the amount of the test journal worn by having the journal run in at a test oil temperature of 100° C. under a load of 150 lb for 1 minute and then running it under a load of 250 lb for 2 hours in accordance with ASTM D 2670.

(Hygroscopicity)

Thirty grams (30 g) of each of the test oils were placed in a 300-ml beaker, allowed to stand for 7 days in an air-conditioned bath maintained at a temperature of 60° C. and a humidity of 30% and then measured for water content by the Karl-Fischer method.

(Thermal and chemical stability)

Thermal and chemical stabilities of the test oils were evaluated by the following sealed tube test with HFC-134a in accordance with JIS K 2211 4.9.

An equi-volume mixture of each of the test oils and the refrigerant (HFC-134a) was sealed, together with copper, iron and aluminum catalysts, in a glass tube and then heated to 250° C. for 168 hours to observe discoloration of the test oil and surface states of the catalysts and determine the degree of discoloration. The degree of discoloration of the test oil was classified into 9 grades ranging from 0 (no discoloration) to 8 (black-brown color).

(Pour point)

The test oils are each measured for specific pour point in accordance with HIS K 2269.

TABLE 1

| Examples, Comparative Examples | Base oils | Epoxy compounds* Kind | Epoxy compounds* Amount (Out wt %) | Kinematic viscosity @ 100° C. (mm²/s) | Miscibility with HFC-134a Miscible Temperature Range (° C.) | Resistivity @ 25° C. (Ω cm) | Falex test Amount of journal worn (mg) | Hygroscopicity 60° C., 30% (%) | Sealed tube test Oil color | Sealed tube test Catalysts Cu | Sealed tube test Catalysts Fe | Sealed tube test Catalysts Al | Pour point (° C.) |
|---|---|---|---|---|---|---|---|---|---|---|---|---|---|
| Example 1 | 1 | None | — | 8.1 | −28 ~ CT** | 4.0 × 10¹⁴ | 26 | 0.19 | 5 | No change | Luster decreased | No change | −45 |
| Example 2 | 1 | t-BuPGE | 0.5 | 8.1 | −28 ~ CT** | 3.9 × 10¹⁴ | 26 | 0.18 | 1 | No change | No change | No change | −45 |
| Com. Ex. 1 | 2 | None | — | 6.2 | −27 ~ CT** | 4.1 × 10¹⁴ | 27 | 0.19 | 4 | No change | Luster decreased | No change | 0 |
| Com. Ex. 2 | 2 | PGE | 0.5 | 6.2 | −27 ~ CT** | 4.2 × 10¹⁴ | 26 | 0.19 | 1 | No change | No change | No change | 0 |
| Com. Ex. 3 | 3 | None | — | 11.5 | −32 ~ CT** | 3.8 × 10¹⁴ | 25 | 0.19 | 4 | No change | Luster decreased | No change | 10 |
| Com. Ex. 4 | 3 | s-BuPGE | 0.5 | 11.5 | −32 ~ CT** | 3.8 × 10¹⁴ | 25 | 0.20 | 1 | No change | No change | No change | 10 |
| Com. Ex. 5 | 4 | None | — | 5.1 | Immiscible | 3.8 × 10¹⁵ | 23 | 0.01 | — | — | — | — | — |
| Com. Ex. 6 | 5 | None | — | 4.8 | Immiscible | 6.4 × 10¹⁵ | 25 | 0.01 | — | — | — | — | — |
| Com. Ex. 7 | 6 | None | — | 4.9 | <−70 ~ 97 | 1.1 × 10¹¹ | 40 | 1.31 | — | — | — | — | — |
| Com. Ex. 8 | 7 | None | — | 10.8 | <−70 ~ 56 | 1.2 × 10¹¹ | 35 | 1.01 | — | — | — | — | — |
| Com. Ex. 9 | 8 | None | — | 10.6 | <−70 ~ 64 | 5.6 × 10¹⁰ | 38 | 2.30 | — | — | — | — | — |
| Com. Ex. 10 | 9 | None | — | 22.4 | −51 ~ 32 | 4.8 × 10¹⁰ | 30 | 1.81 | — | — | — | — | — |
| Com. Ex. 11 | 10 | None | — | 6.1 | Immiscible | — | — | — | — | — | — | — | — |
| Com. Ex. 12 | 11 | None | — | 4.9 | Immiscible | — | — | — | — | — | — | — | — |

TABLE 1-continued

| Examples, Comparative Examples | Base oils | Epoxy compounds* Kind | Amount (Out wt %) | Kinematic viscosity @ 100° C. (mm²/s) | Miscibility with HFC-134a Miscible Temperature Range (° C.) | Resistivity @ 25° C. (Ω cm) | Falex test Amount of journal worn (mg) | Hygroscopicity 60° C., 30% (%) | Sealed tube test Oil color | Catalysts Cu | Fe | Al | Pour point (° C.) |
|---|---|---|---|---|---|---|---|---|---|---|---|---|---|
| Com. Ex. 13 | 12 | None | — | 5.4 | Immiscible | — | — | — | — | — | — | — | — |
| Com. Ex. 14 | 13 | None | — | 4.4 | Immiscible | — | — | — | — | — | — | — | — |

*PGE; Phenyl Glycidyl Ether
s-BuPGE; s-Butylphenyl Glycidyl Ether
t-BuPGE; t-Butylphenyl Glycidyl Ether
**CT; Critical temperature of HFC-134a (102° C.)

It is apparent from the results indicated in Table 1 that the refrigerator oils (Examples 1 and 2) according to the present invention are excellent in miscibility with a refrigerant, HFC-134a, as compared with those of Comparative Examples 5–6 and 11–14.

As is apparent from the results indicated in Table 1, the esters of Comparative Examples 11 and 13 in which the alkyl groups of the acid moiety are all straight-chain ones are inferior in miscibility with the refrigerant. Further, Table 1 shows that the esters of Comparative Examples 12 and 14 which have heretofore been used as lubricating oils, refrigerator oils and the like and in which the acid moiety is originated from a natural fat or oil, are also inferior in miscibility with the refrigerant.

Table 1 further shows that the ethers of Comparative Examples 7 and 8 as well as the polyoxypropylene glycols of Comparative Examples 9 and 10 are excellent in miscibility with the refrigerant, but these ethers and glycols are inferior in insulating property thereby rendering them unusable for hermetic type compressors. Still further, Table 1 shows that the ethers and glycols of Comparative Examples 7–10 have hygroscopicity 5–10 times that of the refrigerator oils of Examples 1 and 2 and are also inferior in electrical insulating property, ice choke, wear resistance, stability and the like to the refrigerator oils of the Examples.

The FALEX wear test shows that the refrigerator oils of Examples 1 and 2 are at least equal in wear resistance to those of Comparative Examples 7–10.

The esters of Comparative Examples 1–4 are at least equivalent to those of Examples 1 and 2 in miscibility with HFC-134a, insulating property, wear resistance and hygroscopicity, but, as is apparent from the results indicated in Table 1 that the refrigerator oils (Examples 1 and 2) according to the present invention are excellent in thermal stability having low pour point as compared with those of Comparative Examples 1–4.

The results of the sealed tube test shows that the refrigerator oils of Example 2 is still more excellent in thermal and chemical stability as compared with the refrigerator oil of Example 1 as well as the refrigerator oils of Comparative Examples 1 and 3.

(Effect of the Invention)

As is apparent from the above comparative experiments, the refrigerator oils according to the present invention are suitable for use in refrigerators using therein a hydrogen-containing halogenocarbon as a refrigerant and are excellent in electrical insulating property, wear resistance, nonhygroscopicity and thermal and chemical stability. In other words, the refrigerator oils according to the present invention have all excellent properties which are important for refrigerator oils.

What is claimed is:

1. A fluid composition for a refrigerator, which comprises a chlorine-free fluorocarbon refrigerant and a refrigerator oil, said refrigerator oil consisting essentially of as a major component a tetraester of pentaerythritol of formula (1)

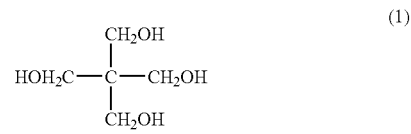

(1)

with both 2-ethylhexanoic acid and 3,5,5-trimethylhexanoic acid, said refrigerator oil exhibiting a pour point not higher than −10° C.

2. The fluid composition according to claim 1 wherein said refrigerator oil has a pour point of −20° C. to −80° C.

3. The fluid composition according to claim 1 wherein said 2-ethylhexanoic acid and 3,5,5-trimethylhexanoic acid are in a molar ratio of 1:1.

4. The fluid composition according to claim 1 which additionally contains 0.1–5% by weight based on the total amount of said refrigerator oil of at least one epoxy compound, said epoxy compound being a member selected from the group consisting of phenylglycidyl ether epoxy compounds, alkylphenylglycidyl ether epoxy compounds, glycidyl ester epoxy compounds, and epoxidized fatty acid monoesters.

5. The fluid composition according claim 1 which additionally contains at least one phosphorus compound selected from the group consisting of phosphoric esters, acid phosphoric esters, amine salts of acid phosphoric esters, chlorinated phosphoric esters, and phosphorous esters.

6. The fluid composition according to claim 1 which additionally contains at least one additive selected from the group consisting of phenol antioxidants, amine antioxidants, wear resistant additives, extreme pressure agents, oiliness improvers, antifoaming agents and metal inactivators.

7. A fluid composition for a refrigerator, which comprises a chlorine-free fluorocarbon refrigerant and a refrigerator oil, said refrigerator oil being as a major component a tetraester of pentaerythritol of formula (1)

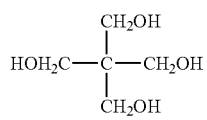

with both 2-ethylhexanoic acid and 3,5,5-trimethylhexanoic acid, said refrigerator oil exhibiting a pour point not higher than −10° C.

8. A fluid composition for a refrigerator, which comprises a chlorine-free fluorocarbon refrigerant and a refrigerator oil, said refrigerator oil consisting of as a major component a tetraester of pentaerythritol of formula (1)

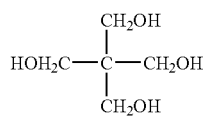

with both 2-ethylhexanoic acid and 3,5,5-trimethylhexanoic acid; and 0.1–5% by weight based on the total amount of said refrigerator oil of at least one epoxy compound selected from the group consisting of phenylglycidyl ether epoxy compounds, alkylphenylglycidyl ether epoxy compounds, glycidyl ester epoxy compounds, and epoxidized fatty acid monoesters and said refrigerator oil exhibiting a pour point not higher than −10° C.

9. A fluid composition for a refrigerator, which comprises a chlorine-free fluorocarbon refrigerant and a refrigerator oil, said refrigerator oil consisting of as a major component a tetraester of pentaerythritol of formula (1)

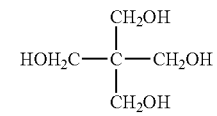

with both 2-ethylhexanoic acid and 3,5,5-trimethylhexanoic acid; and at least one conventional oil selected from the group consisting of paraffinic mineral oils, naphthenic mineral oils, polyα-olefins and alkylbenzenes and said refrigerator oil exhibiting a pour point not higher than −10° C.

10. A fluid composition for a refrigerator, which comprises a chlorine-free fluorocarbon refrigerant and a refrigerator oil, said refrigerator oil consisting of as a major component a tetraester of pentaerythritol of formula (1)

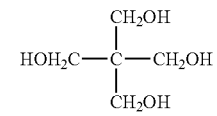

with both 2-ethylhexanoic acid and 3,5,5-trimethylhexanoic acid; and 0.1–5.0% by weight based on the total amount of said refrigerator oil of at least one phosphorus compound selected from the group consisting of phosphoric esters, acid phosphoric esters, amine salts of acid phosphoric esters, chlorinated phosphoric esters, and phosphorous esters and said refrigerator oil exhibiting a pour point not higher than −10° C.

11. A fluid composition for a refrigerator, which comprises a chlorine-free fluorocarbon refrigerant and a refrigerator oil, said refrigerator oil consisting of as a major component a tetraester of pentaerythritol of formula (1)

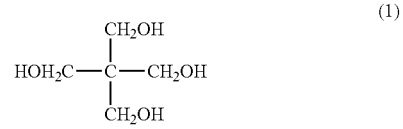

with both 2-ethylhexanoic acid and 3,5,5-trimethylhexanoic acid; and not more than 10% by weight of at least one additive selected from the group consisting of phenol antioxidants, amine antioxidants, wear resistant additives, extreme pressure agents, oiliness improvers, antifoaming agents and metal inactivators and said refrigerator oil exhibiting a pour point not higher than −10° C.

12. A fluid composition for a refrigerator, which comprises a chlorine-free fluorocarbon refrigerant and a refrigerator oil, said refrigerator oil consisting of as a major component a tetraester of pentaerythritol of formula (1)

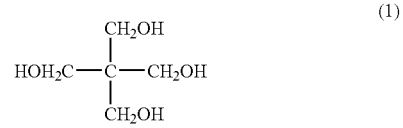

with both 2-ethylhexanoic acid and 3,5,5-trimethylhexanoic acid; at least one conventional oil selected from the group consisting of paraffinic mineral oils, naphthenic mineral oils, polyα-olefins and alkylbenzenes; and 0.1–5% by weight based on the total amount of said refrigerator oil of at least one epoxy compound, said epoxy compound being a member selected from the group consisting of phenylglycidyl ether epoxy compounds, alkylphenylglycidyl ether epoxy compounds, glycidyl ester epoxy compounds, and epoxidized fatty acid monoesters and said refrigerator oil exhibiting a pour point not higher than −10° C.

13. A fluid composition for a refrigerator, which comprises a chlorine-free fluorocarbon refrigerant and a refrigerator oil, said refrigerator oil being as a major component a tetraester of pentaerythritol of formula (1)

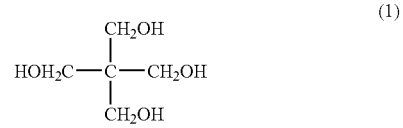

with both 2-ethylhexanoic acid and 3,5,5-trimethylhexanoic acid; 0.1–5% by weight based on the total amount of said refrigerator oil of at least one epoxy compound, said epoxy compound being a member selected from the group consisting of phenylglycidyl ether epoxy compounds, alkylphenylglycidyl ether epoxy compounds, glycidyl ester epoxy compounds, and epoxidized fatty acid monoesters; and 0.1–5.0% by weight based on the total amount of said refrigerator oil of at least one phosphorus compound selected from the group consisting of phosphoric esters, acid phosphoric esters, amine salts of acid phosphoric esters, chlorinated phosphoric esters, and phosphorous esters and said refrigerator oil exhibiting a pour point not higher than −10° C.

14. A fluid composition for a refrigerator, which comprises a chlorine-free fluorocarbon refrigerant and a refrigerator oil, said refrigerator oil being as a major component a tetraester of pentaerythritol of formula (1)

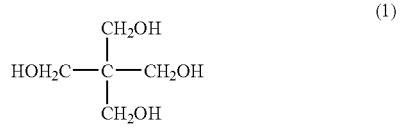

with both 2-ethylhexanoic acid and 3,5,5-trimethylhexanoic acid; 0.1–5.0% by weight based on the total amount of said refrigerator oil of at least one phosphorus compound selected from the group consisting of phosphoric esters, acid phosphoric esters, amine salts of acid phosphoric esters, chlorinated phosphoric esters, and phosphorous esters; and not more than 10% by weight of at least one additive selected from the group consisting of phenol antioxidants, amine antioxidants, wear resistant additives, extreme pressure agents, oiliness improvers, antifoaming agents and metal inactivators and said refrigerator oil exhibiting a pour point not higher than −10° C.

15. A fluid composition for a refrigerator, which comprises a chlorine-free fluorocarbon refrigerant and a refrigerator oil, said refrigerator oil consisting of as a major component a tetraester of pentaerythritol of formula (1)

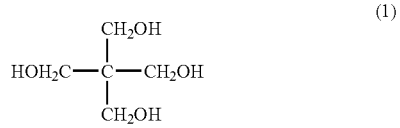

with both 2-ethylhexanoic acid and 3,5,5-trimethylhexanoic acid; at least one conventional oil selected from the group consisting of paraffinic mineral oils, naphthenic mineral oils, polyα-olefins and alkylbenzenes; and 0.1–5.0% by weight based on the total amount of said refrigerator oil of at least one phosphorus compound selected from the group consisting of phosphoric esters, acid phosphoric esters, amine salts of acid phosphoric esters, chlorinated phosphoric esters, and phosphorous esters and said refrigerator oil exhibiting a pour point not higher than −10° C.

16. A fluid composition for a refrigerator, which comprises a chlorine-free fluorocarbon refrigerant and a refrigerator oil, said refrigerator oil being as a major component a tetraester of pentaerythritol of formula (1)

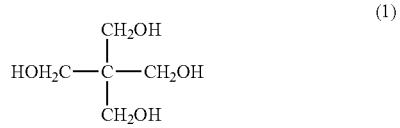

with both 2-ethylhexanoic acid and 3,5,5-trimethylhexanoic acid; 0.1–5% by weight based on the total amount of said refrigerator oil of at least one epoxy compound, said epoxy compound being a member selected from the group consisting of phenylglycidyl ether epoxy compounds, alkylphenylglycidyl ether epoxy compounds, glycidyl ester epoxy compounds, and epoxidized fatty acid monoesters; and not more than 10% by weight of at least one additive selected from the group consisting of phenol antioxidants, amine antioxidants, wear resistant additives, extreme pressure agents, oiliness improvers, antifoaming agents and metal inactivators and said refrigerator oil exhibiting a pour point not higher than −10° C.

17. A fluid composition for a refrigerator, which comprises a chlorine-free fluorocarbon refrigerant and a refrigerator oil, said refrigerator oil consisting of as a major component a tetraester of pentaerythritol of formula (1)

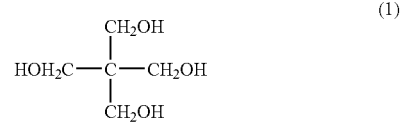

with both 2-ethylhexanoic acid and 3,5,5-trimethylhexanoic acid; at least one conventional oil selected from the group consisting of paraffinic mineral oils, naphthenic mineral oils, polyα-olefins and alkylbenzenes; and not more than 10% by weight of at least one additive selected from the group consisting of phenol antioxidants, amine antioxidants, wear resistant additives, extreme pressure agents, oiliness improvers, antifoaming agents and metal inactivators and said refrigerator oil exhibiting a pour point not higher than −10° C.

18. A fluid composition for a refrigerator, which comprises a chlorine-free fluorocarbon refrigerant and a refrigerator oil, said refrigerator oil consisting of as a major component a tetraester of pentaerythritol of formula (1)

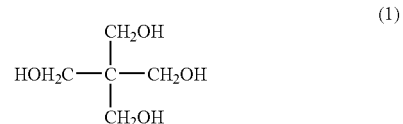

with both 2-ethylhexanoic acid and 3,5,5-trimethylhexanoic acid; at least one conventional oil selected from the group consisting of paraffinic mineral oils, naphthenic mineral oils, polyα-olefins and alkylbenzenes; 0.1–5% by weight based on the total amount of said refrigerator oil of at least one epoxy compound, said epoxy compound being a member selected from the group consisting of phenylglycidyl ether epoxy compounds, alkylphenylglycidyl ether epoxy compounds, glycidyl ester epoxy compounds, and epoxidized fatty acid monoesters; and 0.1–5.0% by weight based on the total amount of said refrigerator oil of at least one phosphorus compound selected from the group consisting of phosphoric esters, acid phosphoric esters, amine salts of acid phosphoric esters, chlorinated phosphoric esters, and phosphorous esters and said refrigerator oil exhibiting a pour point not higher than −10° C.

19. A fluid composition for a refrigerator, which comprises a chlorine-free fluorocarbon refrigerant and 1–500 parts by weight based on 100 parts by weight of said refrigerant of a refrigerator oil, said refrigerator oil consisting of as a major component a tetraester of pentaerythritol of formula (1)

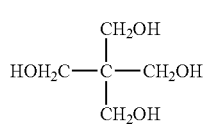
(1)

with both 2-ethylhexanoic acid and 3,5,5-trimethylhexanoic acid; at least one conventional oil selected from the group consisting of paraffinic mineral oils, naphthenic mineral oils, polyα-olefins and alkylbenzenes; 0.1–5.0% by weight based on the total amount of said refrigerator oil of at least one phosphorus compound selected from the group consisting of phosphoric esters, acid phosphoric esters, amine salts of acid phosphoric esters, chlorinated phosphoric esters, and phosphorous esters; and not more than 10% by weight of at least one additive selected from the group consisting—of phenol antioxidants, amine antioxidants, wear resistant additives, extreme pressure agents, oiliness improvers, antifoaming agents and metal inactivators and said refrigerator oil exhibiting a pour point not higher than −10° C.

20. A fluid composition for a refrigerator, which comprises a chlorine-free fluorocarbon refrigerant and a refrigerator oil, said refrigerator oil consisting of as a major component a tetraester of pentaerythritol of formula (1)

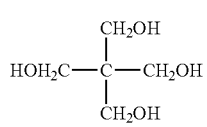
(1)

with both 2-ethylhexanoic acid and 3,5,5-trimethylhexanoic acid; 0.1–5% by weight based on the total amount of said refrigerator oil of at least one epoxy compound, said epoxy compound being a member selected from the group consisting of phenylglycidyl ether epoxy compounds, alkylphenylglycidyl ether epoxy compounds, glycidyl ester epoxy compounds, and epoxidized fatty acid monoesters; 0.1–5.0% by weight based on the total amount of said refrigerator oil of at least one phosphorus compound selected from the group consisting of phosphoric esters, acid phosphoric esters, amine salts of acid phosphoric esters, chlorinated phosphoric esters, and phosphorous esters; and not more than 10% by weight of at least one additive selected from the group consisting of phenol antioxidants, amine antioxidants, wear resistant additives, extreme pressure agents, oiliness improvers, antifoaming agents and metal inactivators and said refrigerator oil exhibiting a pour point not higher than −10° C.

21. A fluid composition for a refrigerator, which comprises a chlorine-free fluorocarbon refrigerant and a refrigerator oil, said refrigerator oil consisting of as a major component a tetraester of pentaerythritol of formula (1)

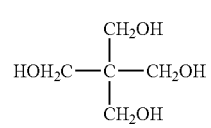
(1)

with both 2-ethylhexanoic acid and 3,5,5-trimethylhexanoic acid; at least one conventional oil selected from the group consisting of paraffinic mineral oils, naphthenic mineral oils, polyα-olefins and alkylbenzenes; 0.1–5%, by weight based on the total amount of said refrigerator oil of at least one epoxy compound, said epoxy compound being a member selected from the group consisting of phenylglycidyl ether epoxy compounds, alkylphenylglycidyl ether epoxy compounds, glycidyl ester epoxy compounds, and epoxidized fatty acid monoesters; and not more than 10% by weight of at least one additive selected from the group consisting of phenol antioxidants, amine antioxidants, wear resistant additives, extreme pressure agents, oiliness improvers, antifoaming agents and metal inactivators and said refrigerator oil exhibiting a pour point not higher than −10° C.

22. A fluid composition for a refrigerator, which comprises a chlorine-free fluorocarbon refrigerant and a refrigerator oil, said refrigerator oil consisting of as a major component a tetraester of pentaerythritol of formula (1)

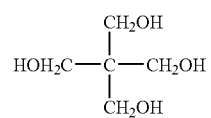
(1)

with both 2-ethylhexanoic acid and 3,5,5-trimethylhexanoic acid; at least one conventional oil selected from the group consisting of paraffinic mineral oils, naphthenic mineral oils, polyα-olefins and alkylbenzenes; 0.1–5% by weight based on the total amount of said refrigerator oil of at least one epoxy compound, said epoxy compound being a member selected from the group consisting of phenylglycidyl ether epoxy compounds, alkylphenylglycidyl ether epoxy compounds, glycidyl ester epoxy compounds, and epoxidized fatty acid monoesters; 0.1–5.0% by weight based on the total amount of said refrigerator oil of at least one phosphorus compound selected from the group consisting of phosphoric esters, acid phosphoric esters, amine salts of acid phosphoric esters, chlorinated phosphoric esters, and phosphorous esters; and not more than 10% by weight of at least one additive selected from the group consisting of phenol antioxidants, amine antioxidants, wear resistant additives, extreme pressure agents, oiliness improvers, antifoaming agents and metal inactivators and said refrigerator oil exhibiting a pour point not higher than −10° C.

* * * * *